(12) United States Patent
Little et al.

(10) Patent No.: US 8,449,205 B2
(45) Date of Patent: May 28, 2013

(54) OPTICAL CONNECTOR WITH PROTECTING MECHANISM TO PREVENT DAMAGE TO FIBER OPTIC LENS

(75) Inventors: Terrance F. Little, York, PA (US); Stephen Sedio, Valley Center, CA (US); James M. Sabo, Harrisburg, PA (US); Tod M. Harlan, Mechanicsburg, PA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 657 days.

(21) Appl. No.: 12/590,283

(22) Filed: Nov. 5, 2009

(65) Prior Publication Data

US 2011/0103752 A1    May 5, 2011

(51) Int. Cl.
*G02B 6/36* (2006.01)
(52) U.S. Cl.
USPC .......................................................... 385/93
(58) Field of Classification Search
USPC .......................................................... 385/93
See application file for complete search history.

(56) References Cited

U.S. PATENT DOCUMENTS

| 7,572,071 | B1 * | 8/2009 | Wu ................................. 385/94 |
| 2006/0025015 | A1 * | 2/2006 | Hu et al. ........................ 439/607 |
| 2008/0261448 | A1 * | 10/2008 | Yi et al. ......................... 439/607 |
| 2009/0093136 | A1 | 4/2009 | Hiew et al. |
| 2009/0316368 | A1 * | 12/2009 | Hiew et al. .................... 361/737 |

FOREIGN PATENT DOCUMENTS

WO    WO-2008121731 A1    10/2008

* cited by examiner

*Primary Examiner* — Uyen Chau N Le
*Assistant Examiner* — Hoang Tran
(74) *Attorney, Agent, or Firm* — Wei Te Chung; Ming Chieh Chang

(57) ABSTRACT

An optical connector (100) defining a receiving space (101) includes an insulative housing (1), a plurality of contacts (2) and an optical fiber module (3) retained in the insulative housing (1). The insulative housing (1) has a base (12) and a tongue (13) extending forwardly from the base (12). The base (12) has a front wall (121) and a cavity (125) extending therethrough. The optical fiber module (3) is received in the cavity (125) and has at least a position post (32) extending forwardly beyond the front wall (121). A protecting mechanism (126) extends into the receiving space (101). The protecting mechanism (126) has a front end (1260) arranged at front of the position post (32) to make the receiving space (101) having a first insertion length (X) and a second insertion length (Y). The second insertion length (Y) is larger than the first insertion length (X).

5 Claims, 17 Drawing Sheets

OPTICAL CONNECTOR WITH PROTECTING MECHANISM TO PREVENT DAMAGE TO FIBER OPTIC LENS

BACKGROUND OF THE INVENTION

1. Field of the Invention

The present invention relates to optical connectors, more particularly to optical connectors with protecting mechanism to prevent damage to fiber optic lens.

2. Description of Related Art

As USB 3.0 proposal was standardized by the USB Implementers Forum (USB-IF) at the end of 2008. USB 3.0 connectors can support a high speed rate of up to at least 4.8 Gbps and can mate with USB 2.0 connectors to adapt an interim from USB 2.0 to USB 3.0. The USB 3.0 can transmit in a limited distance which does not efficiently meet requirement of data transmission speed for optical devices such as DVD, Blue-ray and HD DVD.

Optical fibers are widely used in fiber-optic communications, which permits transmission over longer distances and at higher bandwidths (data rates) than other forms of communications. Fibers are used instead of metal wires because signals travel along them with less loss, and they are also immune to electromagnetic interference. Therefore, engineers designed an optical connector which added an optical fiber module with fibers to the USB connectors for transmitting over longer distances and higher speed rate. The optical connector can meet requirement of data transmission speed for optical devices such as DVD, Blue-ray and HD DVD et al. The optical connector can also mate with a USB connector for having a wider application. The optical fiber module has a position post engaging with a hole of a corresponding optical plug for ensuring an exact connection between the optical connector and plug. However, we know a mi Micro-Card as disclosed in US Patent NO. 2009/0093136 is designed to have an USB plug at a front side thereof and can mate with an USB connector, so that when a mi Micro-Card is inserted into the optical connector, or an unmatchable plug is inserted into the optical connector overly, the optical fiber module will be hit and broken, it is inconvenient to the exact connection between the optical connector and plug.

Hence, an improved optical connector is desired to overcome the above problems.

BRIEF SUMMARY OF THE INVENTION

According to one aspect of the present Invention, an optical connector defines a receiving space for receiving an optical plug. The optical connector comprises an insulative housing having a base and a tongue extending forwardly from the base, the base having a front wall and a cavity extending therethrough along a front to back direction of the insulative housing; a plurality of contacts retained in the insulative housing; an optical fiber module received in the cavity and extending forwardly beyond the front wall; and a protecting mechanism extending into the receiving space, the protecting mechanism having a front end arranged at front of the optical fiber module along the front to back direction to make the receiving space having a first insertion length and a second insertion length; wherein the second insertion length is larger than the first insertion length.

According to another aspect of the present invention, an optical plug for mating with an optical connector comprises an insulative housing having a tongue extending forwardly, the tongue defining a front face for mating with the optical connector, and at least a cutout recessed from the front face for receiving a projection mechanism of the optical connector; a plurality of contacts retained in the insulative housing; and an optical fiber module retained in the insulative housing.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
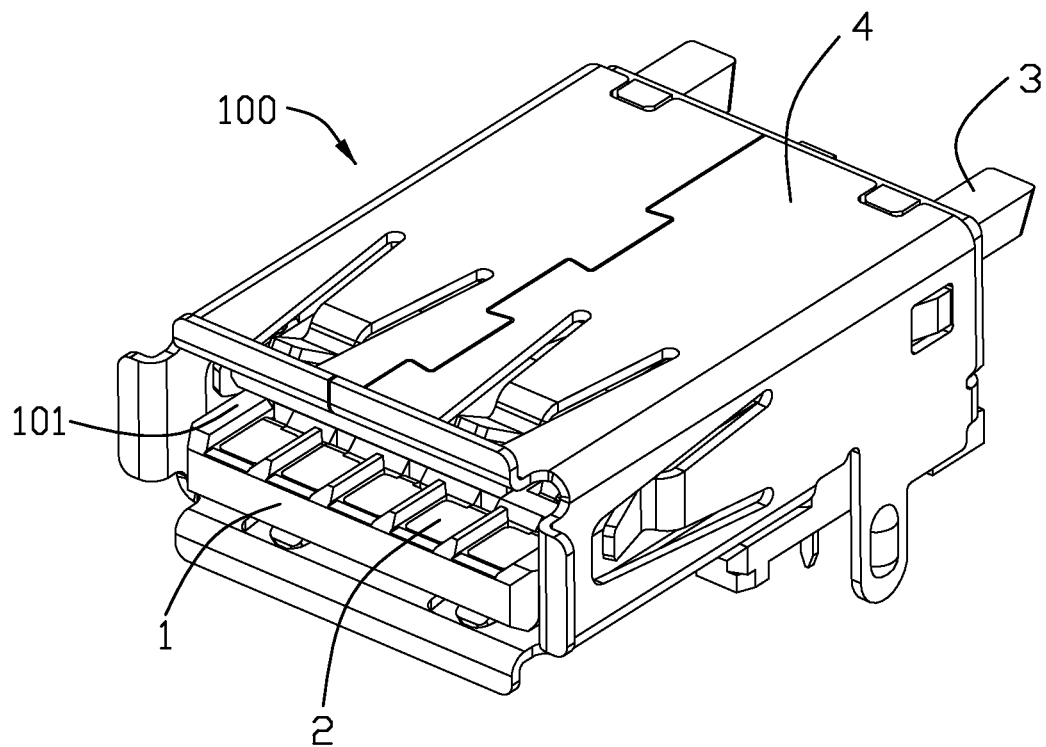
FIG. 1 is a perspective view of an optical connector according to a first embodiment the present invention.
Figure 2:
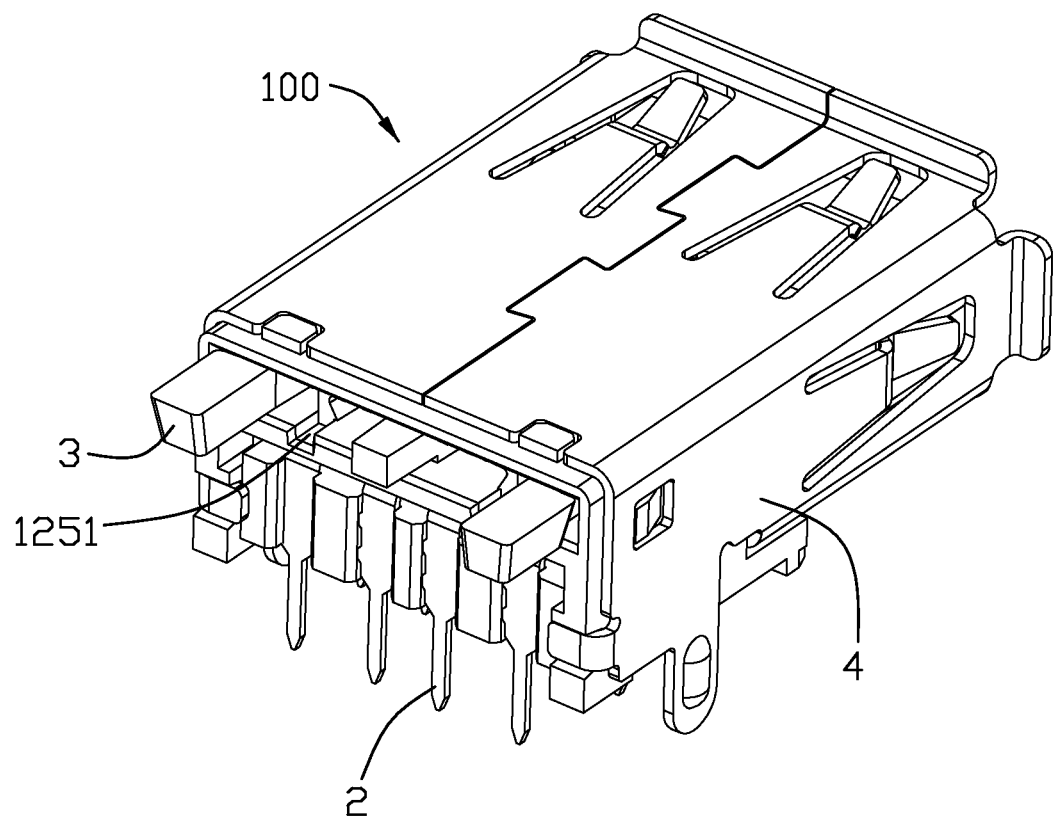
FIG. 2 is a view similar to FIG. 1, while taken from a different aspect.
Figure 3:
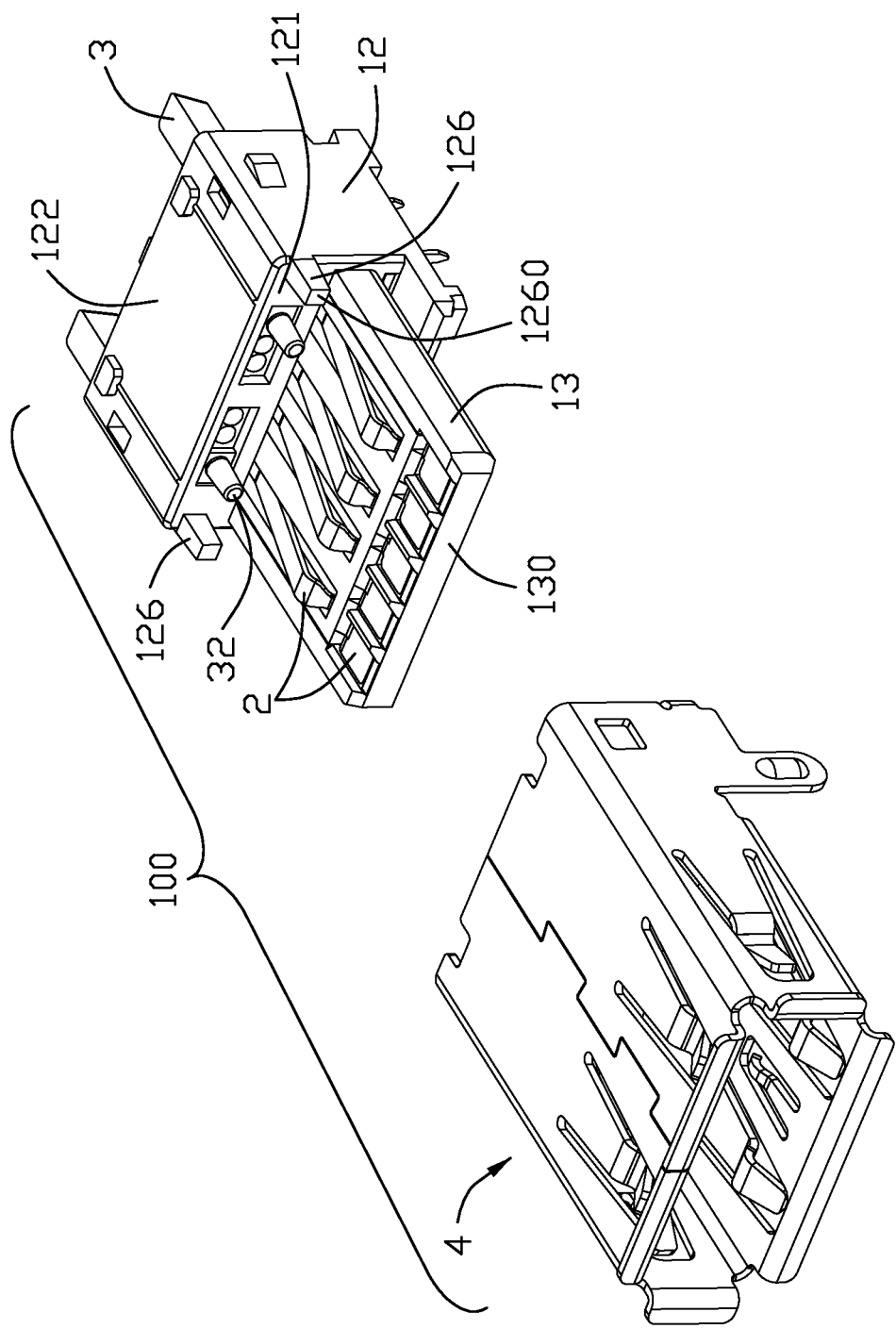
FIG. 3 is a partially exploded view of an optical connector shown in FIG. 1.
Figure 4:
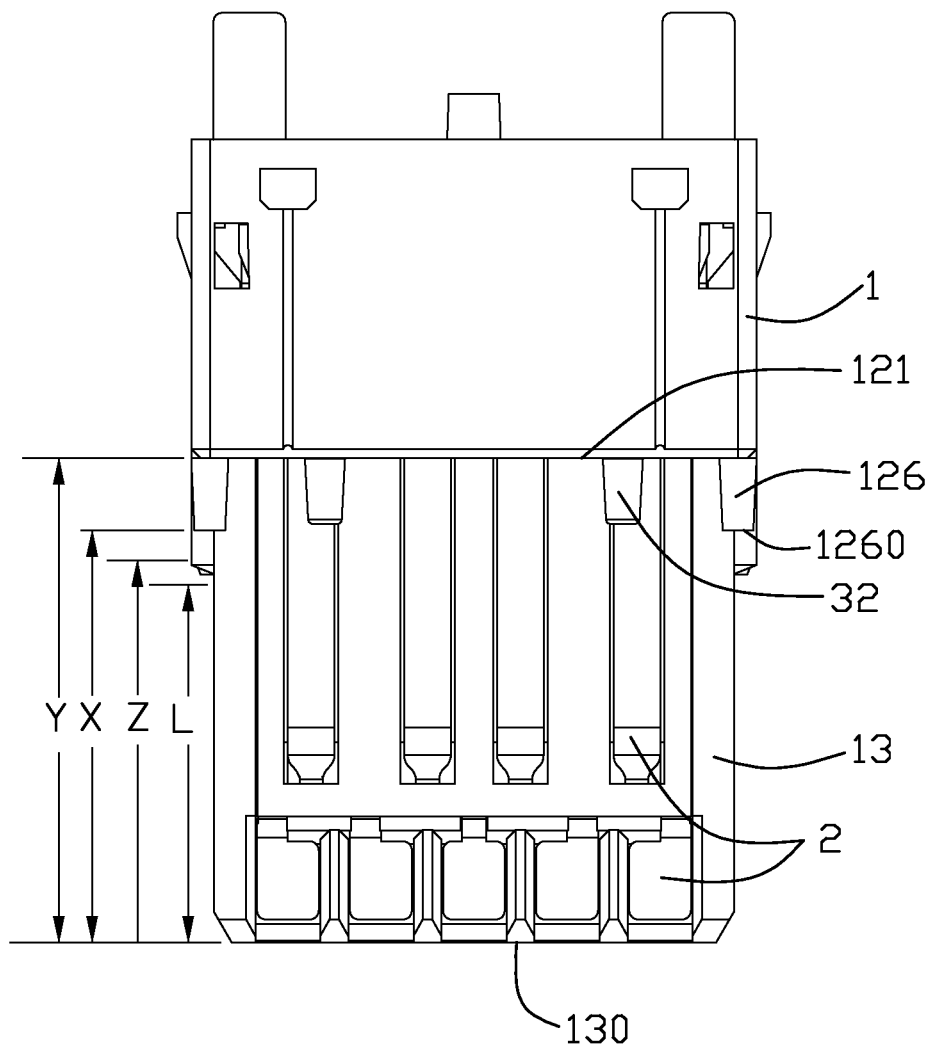
FIG. 4 is a top plan view of a part of the optical connector shown in FIG. 3.
Figure 5:
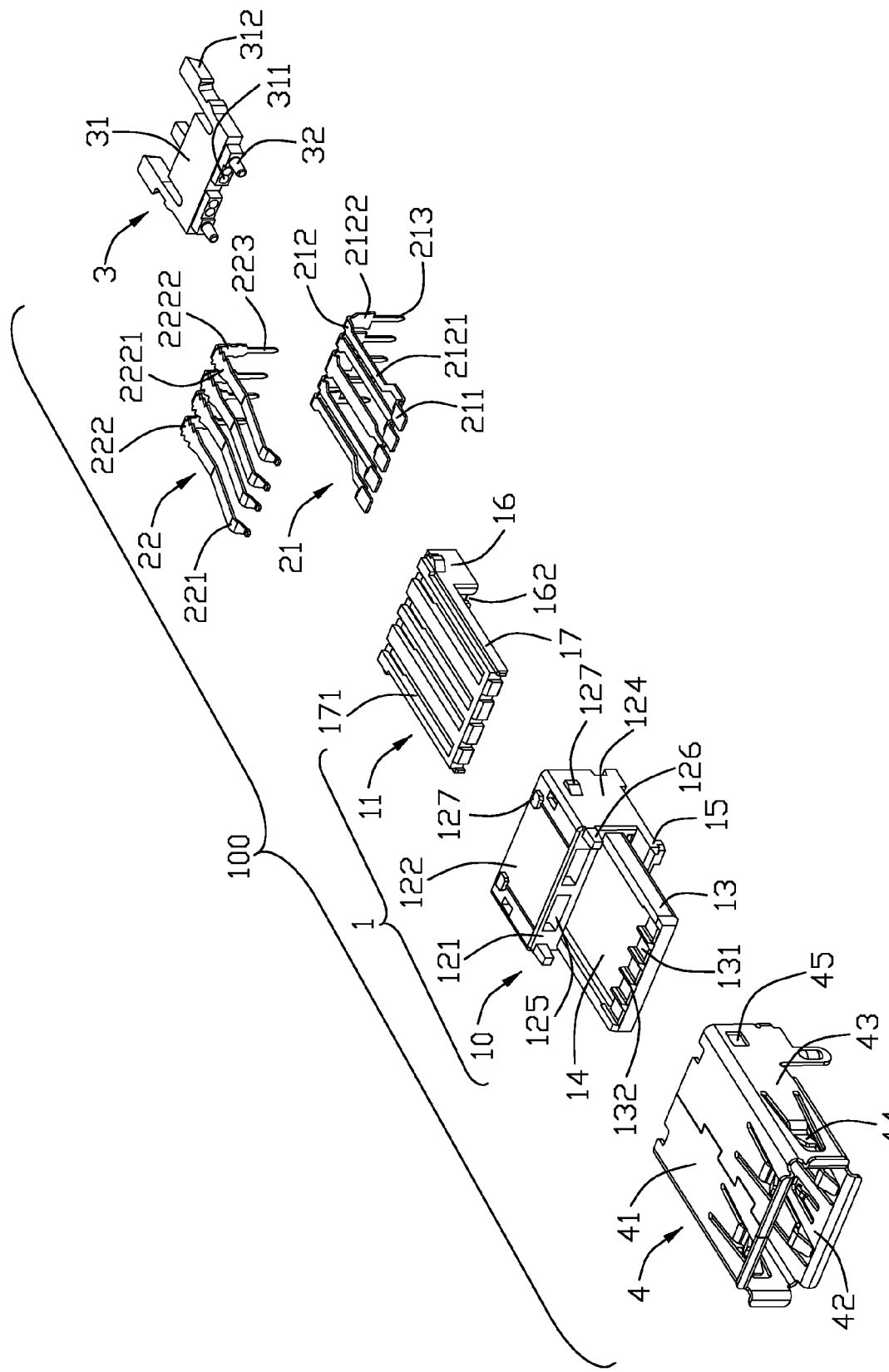
FIG. 5 is an exploded view of the optical connector shown in FIG. 1.
Figure 6:
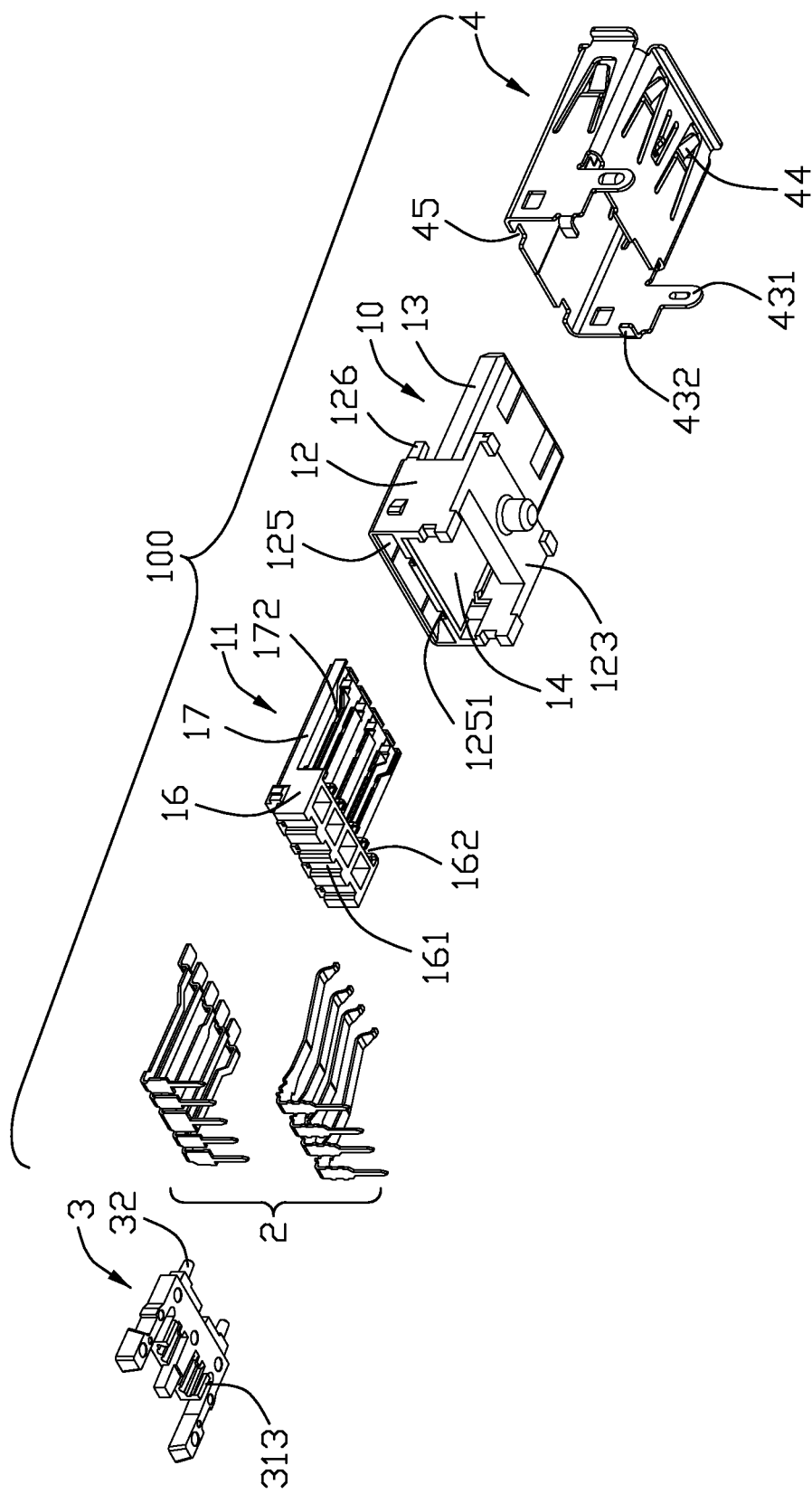
FIG. 6 is a view similar to FIG. 5, while taken from a different aspect.
Figure 7:
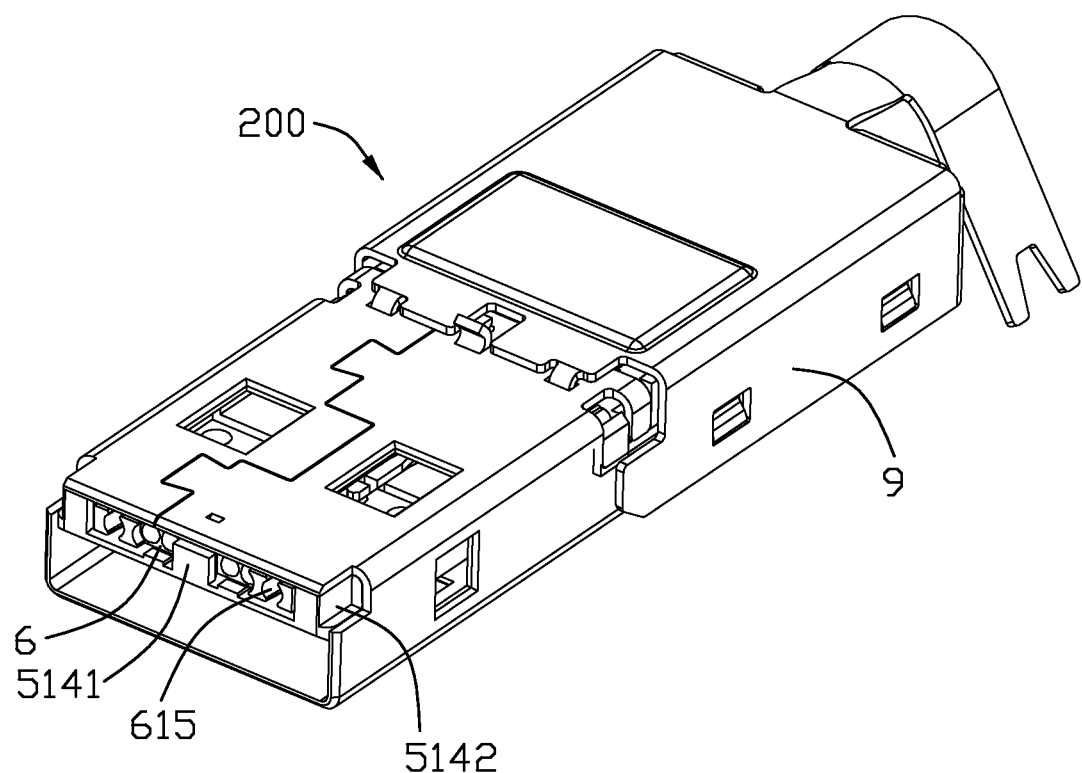
FIG. 7 is a perspective view of an optical plug mating with the optical connector shown in FIG. 1.
Figure 8:
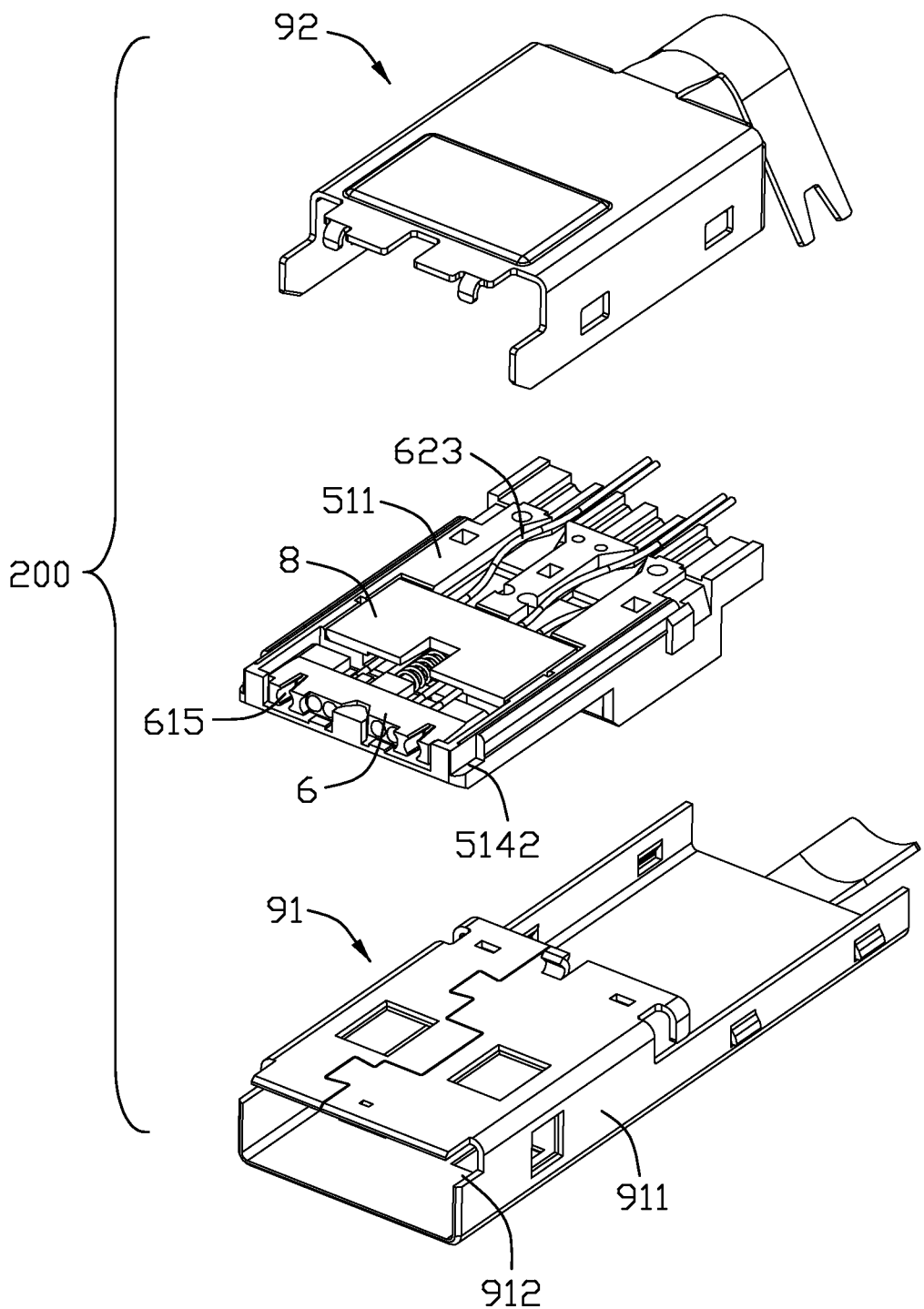
FIG. 8 is a partially exploded view of the optical plug shown in FIG. 7.
Figure 9:
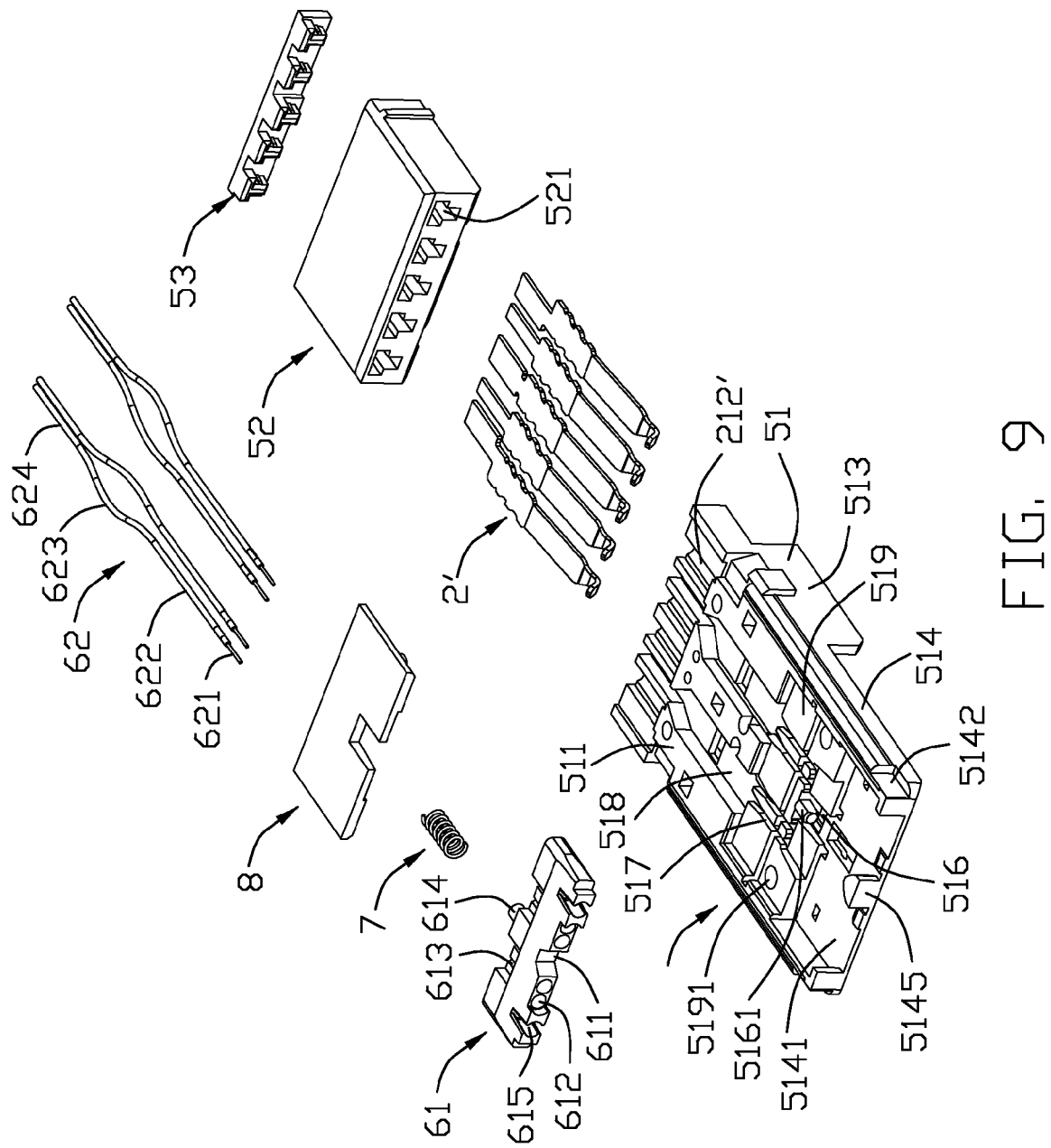
FIG. 9 is an exploded view of the optical plug with out a metal shell thereof.
Figure 10:
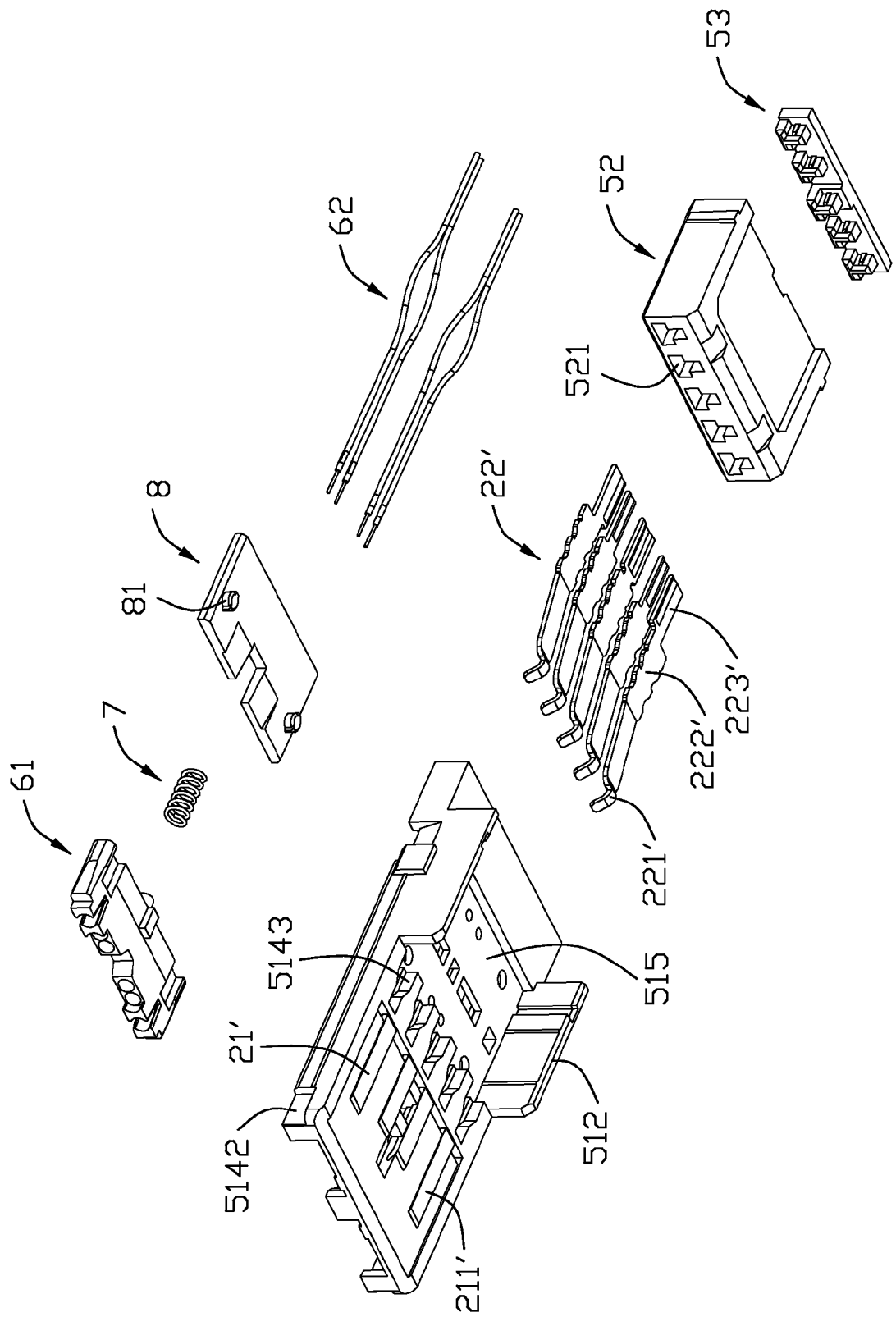
FIG. 10 is a view similar to FIG. 9, while taken from a different aspect.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-7, an optical connector 100 mating with an optical plug 200 according to a first embodiment in the present invention is disclosed. The optical connector 100 defines a receiving space 101 which can non-simultaneously receive the optical plug 200, a standard USB 2.0 A type plug (not shown), a standard USB 3.0 A type plug (not shown), or a mi Micro-Card 300. The mi Micro-Card 300 has an USB plug 301 at a front end thereof.

Referring to FIGS. 1-6, the optical connector 100 comprises an insulative housing 1, a plurality of contacts 2 retained in the insulative housing 1, an optical fiber module 3 retained in the insulative housing 1 and a metal shell 4 covering the insulative housing 1. The insulative housing 1 comprises a first housing 10 and a second housing 11 combined to each other along a front to back direction thereof. The contacts 2 comprise a plurality of first contacts 21 and a plurality of contacts 22.

The first housing 10 has a base 12 and a first tongue 13 extending forwardly from the base 12. The base 12 has a front wall 121, a top wall 122, a bottom wall 123 and a pair of side walls 124. The front wall 121 is a first mating face 121 to mate with the optical plug 200. The base 12 defines a cavity 125 extending therethrough along the front to back direction to receive the first optical fiber module 3. The cavity 125 is located at an upper side of the first tongue 13 and spaced apart from the first tongue 13 along both the front to back direction and an up to down direction. A pair of locating slots 1251 are depressed from a bottom wall of the cavity 125. The locating slots 1251 extend along the front-to-back direction for guiding the optical fiber module 3 to be inserted into the cavity 125. The base 12 has a pair of projections 126 extending forwardly from the front wall 121 and located at two sides of the cavity 125. The projections 126 extend into the receiving space 101 to make the receiving space 101 having a first insertion length X and a second insertion length Y.

The projection 126 has a front end 1260 which is a second mating face 1260 to mate with a mi Micro-Card 300, at the same time, the mi Micro-Card 300 can be prevented by the projections 126 from continuously moving inwardly to hit the optical fiber module 3. The first tongue 13 defines a front face 130 at a front end thereof. The front end 1260 is closer to the front face 130 than the front wall 121 to the front face 130. The first insertion length X is a length between the front end 1260 and the front face 130 of the tongue 13. The second insertion length Y is a length between the front wall 121 and the front face 130 of the tongue 13. Therefore, the second insertion length Y is larger than the first insertion length X. The mi Micro-Card 300 can move the first insertion length X and be stopped by the projections 126. In addition, the receiving space 101 further defines a third insertion length Z which is shorter than the first insertion length X and a fourth insertion length L which is shorter than the third insertion length Z. The third insertion length Z and the fourth insertion length L both begin from the front face 130 of the tongue 13 and end in a different position in the receiving space 101. The third insertion length Z is an insertion length of the USB 3.0 A type plug. The fourth insertion length L is an insertion length of the USB 2.0 A type plug. The front face 130 of the tongue 13 is a stop face which can stop the USB 2.0 and 3.0 plug being inserted into the receiving space 101 overly. The top wall 122 and side walls 124 each has a plurality of protrusions 127 to engage with the metal shell 4.

The first tongue 13 defines a plurality of recesses 131 at a front side thereof and a plurality of ribs 132 between every two adjacent recesses 131. The first housing 10 defines a pocket 14 extending therethrough along the front to back direction to receive the second housing 11. The pocket 14 is located at a rear side of the recesses 131 and is joined with the recesses 131. In addition, the pocket 14 is located at a lower side of the cavity 125 and spaced apart from the cavity 125 along the up to down direction. Besides, the first housing 10 has an accessory board 15 extending forwardly from a bottom side of the front wall 121 to protect the metal shell 4 from being distorted. The accessory board 15 is spaced apart from the first tongue 13 along the up to down direction.

The second housing 11 is received in the pocket 14, and has a body portion 16 and a second tongue 17 extending forwardly from the body portion 16. The second tongue 17 defines a plurality of first passageways 171 at an upper side thereof and a plurality of second passageways 172 at a lower side thereof. The first passageways 171 extend through the body portion 16 along the front to back direction. The second passageways 172 extend through the second tongue 17 along the front to back direction. The body portion 16 defines a plurality of first grooves 161 at a rear side thereof and a plurality of second grooves 162 at a front side thereof. The first grooves 161 are corresponding to the first passageways 171 and extend through the body portion 16 along the up to down direction. The second grooves 162 are joined with the second passageways 172.

The first contacts 21 each has a first securing portion 212 retained in an inner side of the second housing 11, an inelastic first contact portion 211 extending out of the second housing 11 from the first securing portion 212, and a first tail portion 213 extending downwardly from the first securing portion 212. The first contact portions 211 are received in the recesses 131 and separated by the ribs 132 for preventing adjacent first contact portions 211 from contacting with each other. The first securing portion 212 has a first level portion 2121 extending along the front to back direction, and a first vertical portion 2122 extending along the up to down direction. The first level portions 2121 are received in the second passageways 172 and sandwiched between the first housing 10 and the second housing 11. The first vertical portions 2122 are retained in the second grooves 162.

The second contacts 22 each has a second securing portion 222 retained in the second housing 11, a second contact portion 221 extending forwardly from the second securing portion 222, and a second tail portion 223 extending downwardly from the second securing portion 222. The second contact portions 221 are elastic and received in the first passageways 171. The second securing portion 222 has a second level portion 2221 extending along the front to back direction, and a second vertical portion 2222 extending along the up to down direction. The second level portions 2221 are received in the first passageways 171 and positioned between the first housing 10 and the second housing 11. The second vertical portions 2222 are retained in the first grooves 161.

The first optical fiber module 3 is retained in the cavity 125, and has a main body 31 and a pair of position posts 32 extending forwardly from a front end of the main body 31. The main body 31 has two pairs of lens 311 between the position posts 32. The position posts 32 extend out of the front wall 121 for mating with the optical plug 200. The lens 311 are located behind the front wall 121. The lens 311 can be coupled with fibers (not shown) connected to a circuit board (not shown) for transmitting high speed optical signals. The main body 31 has a pair of guiding blocks 313 extending along the front-to-back direction, and a pair of elastic arms 312 extending backwardly from two sides thereof. The guiding blocks 313 move in the locating slots 1251 forwardly for guiding the optical fiber module 3 to be assembled in the cavity 125. The spring arms 312 engage with inside wall of the cavity 125 for fixing the optical fiber module 3 in the cavity 125. A front end of the position post 32 is arranged behind the front end 1260 of the projections 126, that is to say a distance between the front end of the position post 32 and the front wall 121 is shorter than a dispersion between the first insertion length X and the second insertion length Y, thereby, the mi Micro-Card 300 can only move the first insertion length X and can not hit the position post 32.

The metal shell 4 has a pair of opposed upper wall 41 and lower wall 42, and a pair of opposed side walls 43. The upper wall 41, lower wall 42, and side walls 43 each has at least a spring arm 44 to engage with the optical plug 200. The upper wall 41 and side walls 43 define a plurality of openings 45 to engage with protrusions 127 for fixing the metal shell 4 to the insulative housing 1. Each side wall 43 has a mounting leg 431 extending downwardly for positioning to a circuit board (not shown), and a retention barb 432 bending inwardly from a rear side thereof to lock with a rear end of the insulative housing 1.

As fully described above, the tongue of the insulative housing 1 is formed by the first tongue 13 and the second tongue 17. An arrangement of the first contact portions 211 and second contact portions 221 on the tongue is compatible to a contact arrangement of a standard USB 3.0 A type receptacle. Therefore, the optical connector 100 can mate with the standard USB 3.0 A type plug and the USB 2.0 A type plug. The tongue of the optical connector 100 is longer than that of the USB 2.0 or USB 3.0 plug, and the USB 2.0 plug can move the fourth insertion length L, the USB 3.0 plug can move the third insertion length Z in the receiving space 101. Both the USB 2.0 and USB 3.0 plug can not come into contact with the front end 1260 of the projections 126, therefore, the optical fiber module 3 can not be hit or broken by the USB 2.0 or USB 3.0 plug. In addition, the optical connector 100 is arranged with protecting mechanism which is a pair of projections 126 with a front end 1260 located at front of the position posts 32. Therefore, the projections 126 can abut against the front ends of the mi Micro-Card 300 to prevent the mi Micro-Card 300 from being inserted into the receiving space 101 overly, the position posts 32 of the optical fiber module 3 can be protected from being hit and broken.

Referring to FIG. 7-10, the optical plug 200 comprises an insulative housing 5, an optical fiber module 6 retained in the insulative housing 5 for mating with the optical fiber module 3 on the optical connector 100, a plurality of contacts 2' retained in the insulative housing 5, a spring 7 positioned between the insulative housing 5 and the optical fiber module 6, a cover 8 and a metal shell 9 covering the insulative housing 5.

The insulative housing 5 comprises a third housing 51, a fourth housing 52 and a spacer 53. The third housing 51 has a top surface 511 and a bottom surface 512, a base 513 and a third tongue 514 extending forwardly from the base 513. The third housing 51 defines a cavity 5141 recessed from the top surface 511 to receive the optical fiber module 6, and a chamber 515 recessed from the bottom surface 512 to receive the fourth housing 52. The cavity 5141 is located at an upper side of the third tongue 514. The third housing 51 further defines an indention 516 behind the cavity 5141, a plurality of thin first slots 517 behind the indention 516 and extending along the front to back direction, and a plurality of wider second slots 518 behind the first slots 517 and positioned with the first slots 517 along the front to back direction. Each second slot 518 defines a width which is wider than that of each first slot 517. The third housing 51 has a first column 5161 extending forwardly into the indention 516 for positioning the spring 7.

The third tongue 514 defines a front face 5141 for mating with the front wall 121 of the base 12 in the optical connector 100, and a pair of cutouts 5142 recessed from two sides of the front face 5141 for receiving the projection mechanism 32 of the optical connector 100. The cutouts 5142 are joined with exterior in both the front to back direction and a width direction. The third housing 51 defines a depression 519 recessed from the top surface 511 and located behind the cavity 5141. The depression 519 is joined with the first slots 517 along the up to down direction. The third housing 51 defines a pair of holes 5191 at two sides of the depression 519. The cover 8 is received in the depression 519 and has a pair of supports 81 to engage with the holes 5191. The tongue 514 is formed with a V-shaped block 5145 at a front side thereof and defines a plurality of third slots 5143 at a lower side thereof.

The contacts 2' comprise a plurality of third contacts 21' and a plurality of fourth contacts 22'. The third contacts 21' are insert molded in the third housing 51 and each has a flat third contact portion 211' extending to the third tongue 514 and located at a front side of the third slots 5143 for connecting with the second contact portions 221 of the optical connector 100, a third tail portion 212' retained at a rear side of the body portion 513. The fourth contacts 22' are retained in the fourth housing 54 and each has an elastic fourth contact portion 221' extending to the third slots 5143, a fourth tail portion 223' extending out of the fourth housing 54, and a fourth securing portion 222' connecting the fourth contact portion 221' and the fourth tail portion 223' together. An arrangement of the third contact portions 211' and fourth contact portions 221' on the third tongue 514 is compatible to a contact arrangement of a standard USB 3.0 A type plug (not shown). The optical fiber module 6 is spaced apart from the third and fourth contact portions 211', 221' along the up to down direction. The second housing 52 is a rectangular insulator and defines a plurality of third passageways 521 extending therethrough along the front to back direction. The fourth securing portions 222' are retained in the third passageways 521'. The spacer 53 extends into the passageways 521 for pressing the fourth securing portions 222'.

The optical fiber module 6 comprises a main body 61 movably received in the cavity 5141 and a plurality of fibers 62 assembled in the main body 61. The main body 61 has a V-shaped recess 611 at a front end thereof to receive the V-shaped block 5145, a pair of lens 612 at two sides of the recess 611, and a pair of position holes 615 at two sides thereof to receive the position posts 32 of the optical fiber module 3 for ensuring an exact mating between the optical plug 200 and the optical connector 100. The main body 61 defines a plurality of receiving holes 613 behind the lens 612 and a second column 614 extending backwardly. The spring 7 has two ends, one of which rings around the first column 5161 and another of which rings around the second column 614 to urge the main body 61 moving along the front to back direction.

The optical plug 200 comprises four fibers 62. Each fiber 62 has a coupling section 621 retained in the receiving holes 613, a positioning section 622 extending backwardly from the coupling section 621, a bending section 623 extending backwardly from the positioning section 622, and a connecting section 624 extending out of the insulative housing 5 for connecting with a cable (not shown). The positioning sections 622 are received in the first slots 517 respectively and pressed by the cover 8, thereby, the main body 61 can hold down by the positioning sections 622, and the main body 61 can not move overly along both the up to down direction and the width direction. The bending sections 623 are received in the second slots 518. The bending sections 623 can unbend when the cable is pulled backwardly for decreasing a pull on the fibers 62, therefore, the fibers 62 can not be torn.

The metal shell 9 comprises a first shell 91 and a second shell 92 combined with each other along the front to back direction. The first shell 91 has a sleeve section 911 enclosing the third tongue 514. The sleeve section 911 defines a pair of apertures 912 at two sides thereof and corresponding to the cutouts 5142.

Figure 11:
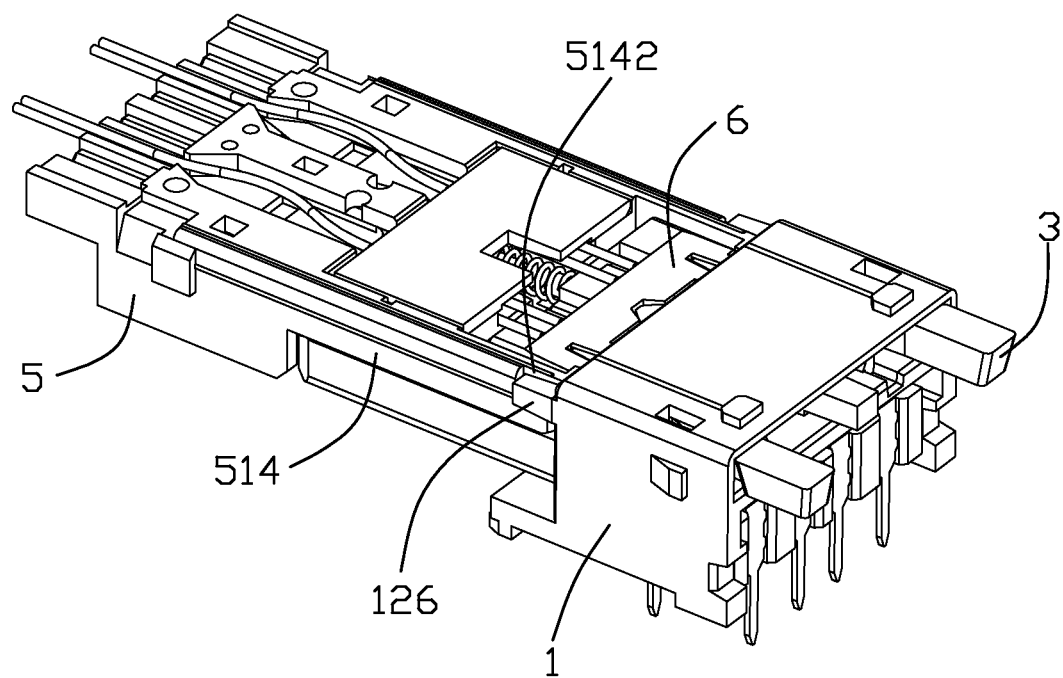
FIG. 11 is a partially perspective view of the optical connector with the optical plug inserted therein.
Figure 12:
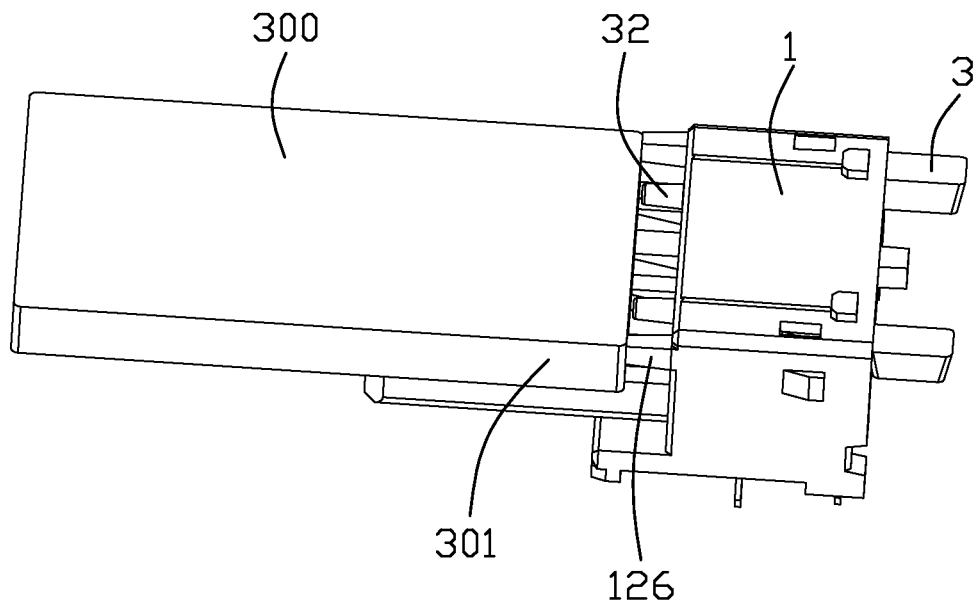
FIG. 12 is a partially perspective view of the optical connector with a mi Micro-Card inserted therein.

Referring to FIG. 11-12, when the optical plug 200 mates with the optical connector 100, the projections 126 are received in the cutouts 5141, so that the optical plug 200 can be inserted to a predetermined full extent in the receiving space 101, that is to say a front face 5140 of the optical plug 200 can mate with the first mating face 121 of the optical connector 100. The predetermined full extent is the second insertion length Y. When the mi Micro-Card 300 is inserted into the receiving space 101 of the optical connector 100, the projections 126 will mate and resist a front end of the mi Micro-Card 300 for preventing the mi Micro-Card 300 from continuously moving inwardly, therefore, the position post 32 can not be hit and broken by the mi Micro-Card 300.

Figure 13:
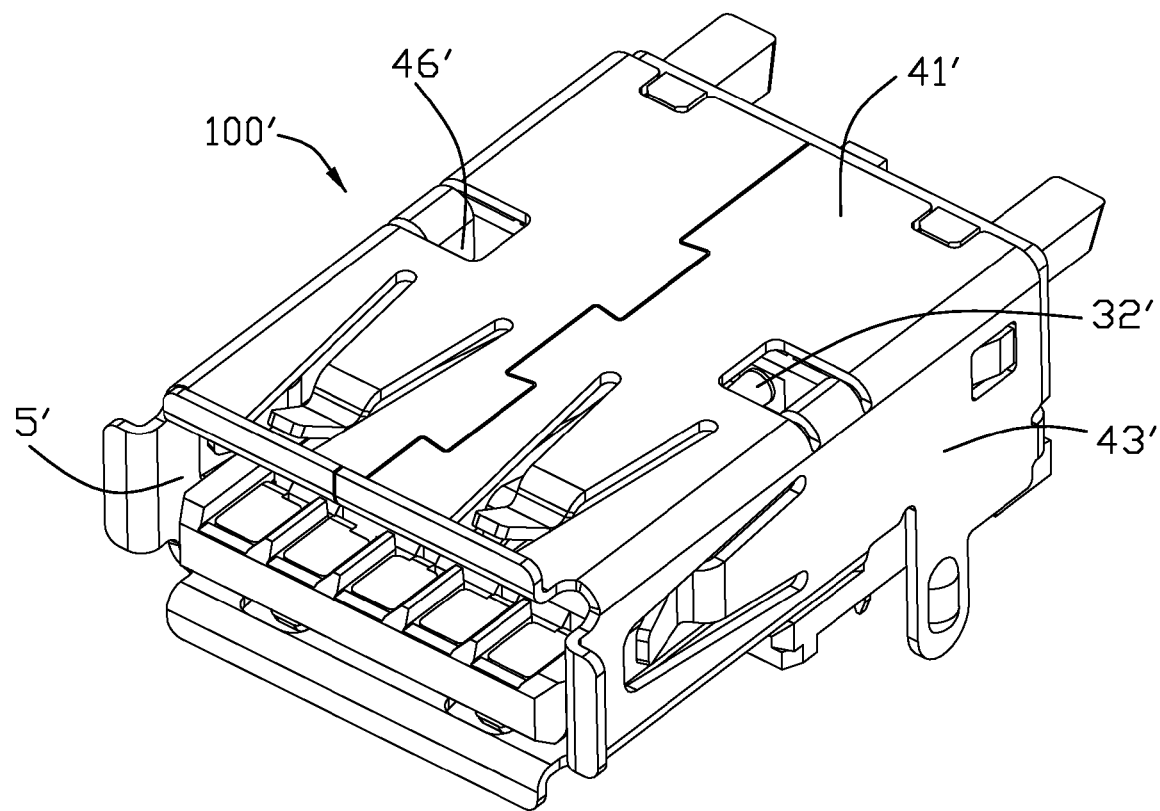
FIG. 13 is a perspective view of an optical connector according to a second embodiment the present invention.
Figure 14:
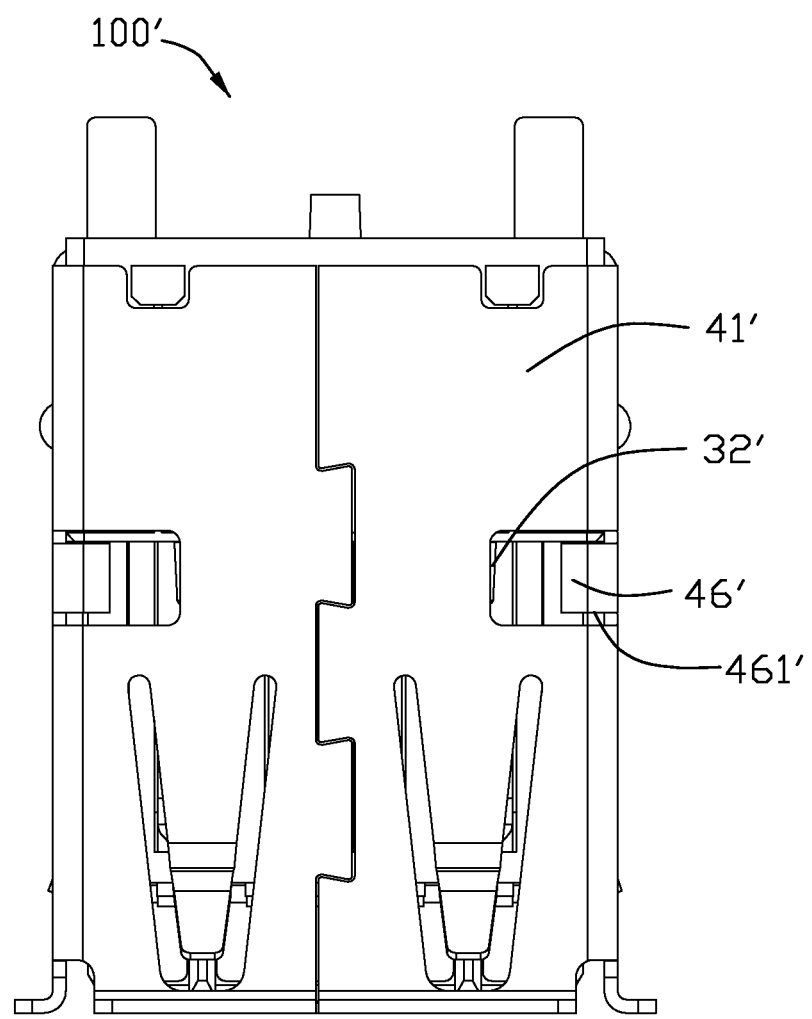
FIG. 14 is a top plan view of the optical connector shown in FIG. 13.
Figure 15:
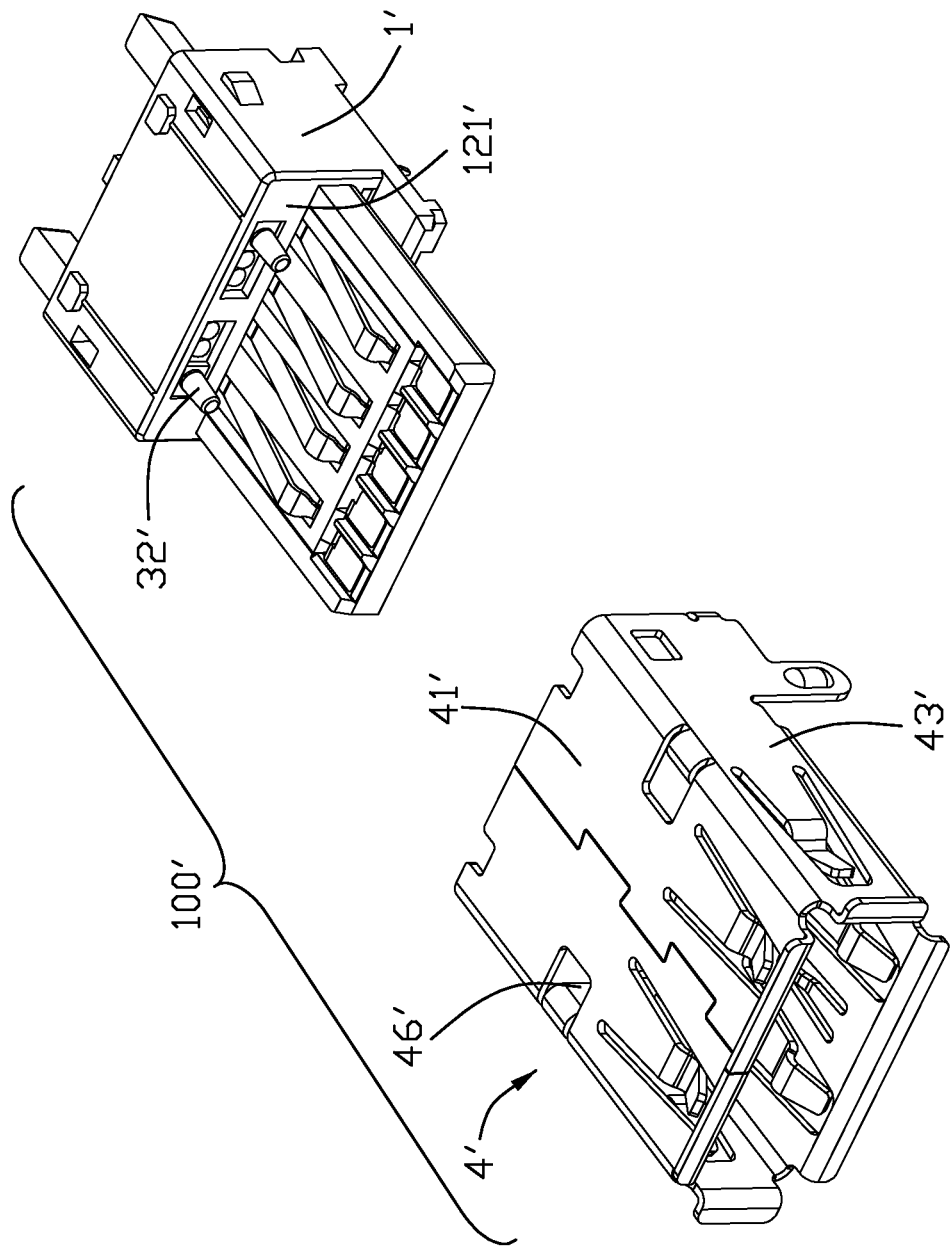
FIG. 15 is a partially exploded view of the optical connector shown in FIG. 13.
Figure 16:
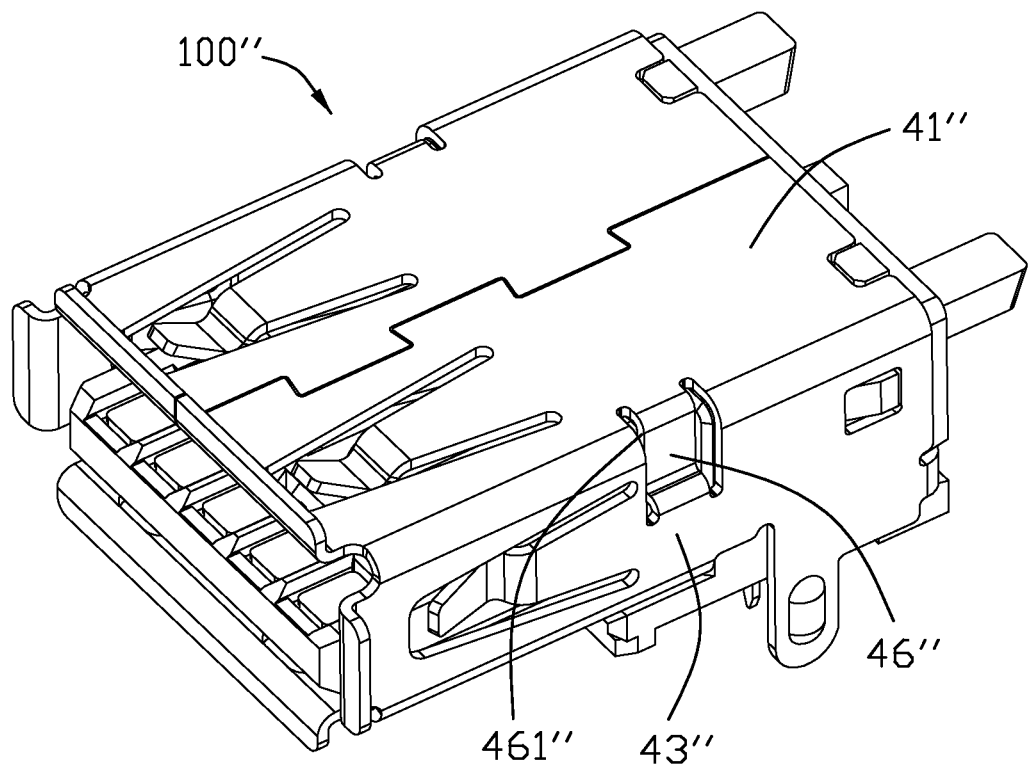
FIG. 16 is a perspective view of an optical connector according to a third embodiment the present invention.
Figure 17:
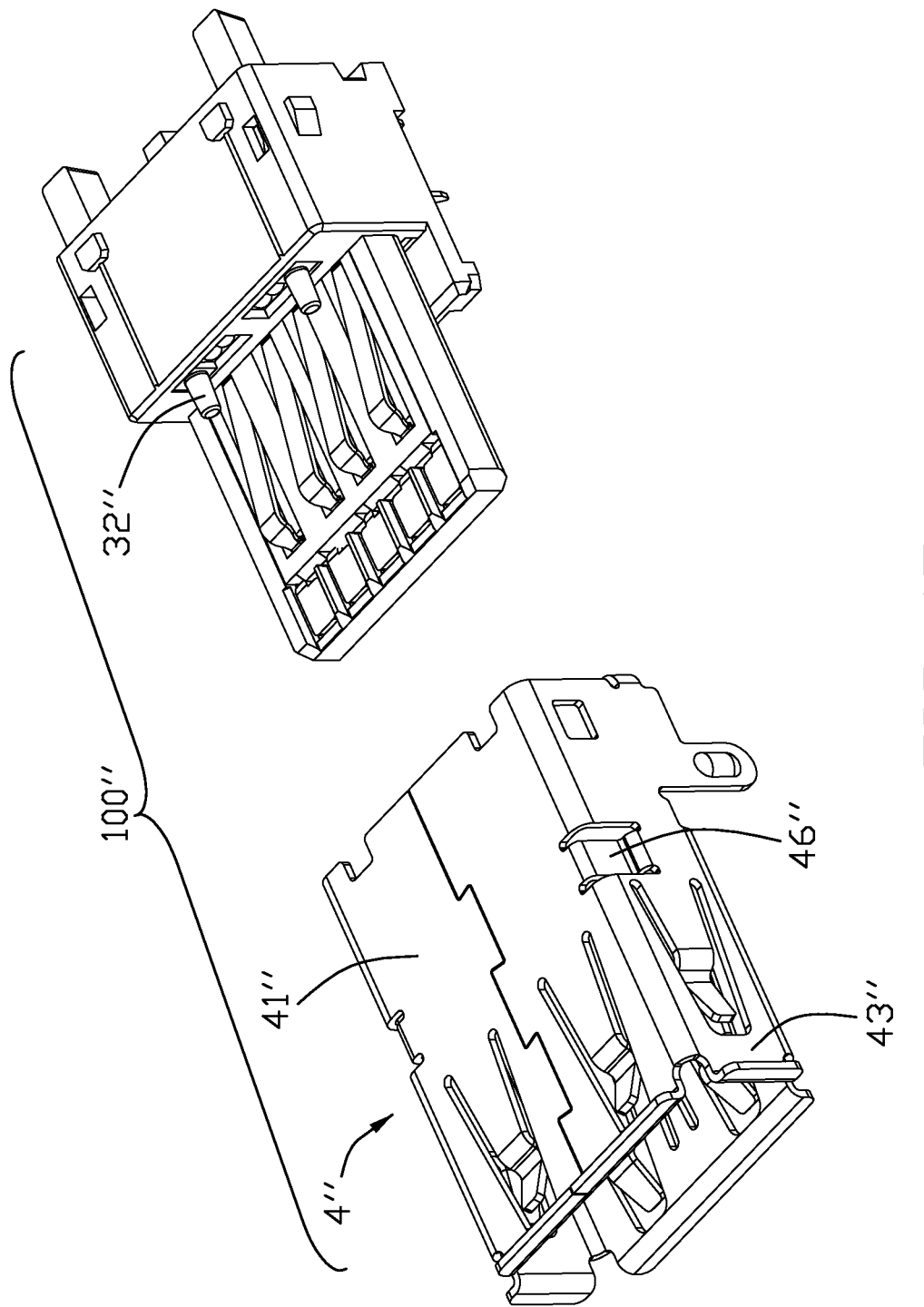
FIG. 17 is a partially exploded view of the optical connector shown in FIG. 16.

Referring to FIGS. 13-15, an optical connector 100' for mating with the optical plug 200 in a second embodiment is disclosed. The optical connector 100' in the second embodiment is approximately similar to the optical connector 100 in the first embodiment, and the difference is that: firstly, an insulative housing 1' in the second embodiment is not formed with the projections 126 which the insulative housing 1 has; secondly, the metal shell 4' of the optical connector 100' is formed with a pair limiting walls 46' extending into the receiving space 101'. The limiting walls 46' are located at a front side of the front wall 121' of the insulative housing 1' and outer sides of the position posts 32' on the optical fiber module 3. Besides, the limiting walls 46' are bended downwardly from the upper wall 41' of the metal shell 4' and extend along the front to back direction. The limiting walls 46' are parallel to the side walls 43' and located at an inner side of the side wall 43'. It should be noted that a front end 461' of the limiting wall 46' is located at a front side of the position posts 32' for protecting the position posts 32' from being hit by the mi Micro-Card 300. Therefore, the protecting mechanism in the second embodiment is the limiting walls 46'.

Referring to FIGS. 11-12, an optical connector 100" for mating with the optical plug 200 in a third embodiment is disclosed. The optical connector 100" in the third embodiment is approximately similar to the optical connector 100' in the second embodiment, and the difference is that: the limiting wall 46" is recessed from the side wall 43", and one end of the limiting wall 46" connects with the upper wall 41", another end of the limiting wall 46" connects with the side wall 43"; the front end 461' of the limiting wall 46" is located at a front side of the position posts 32" for protecting the position posts 32" from being hit by the mi Micro-Card 300. Therefore, the protecting mechanism in the third embodiment is the limiting wall 46".

As fully described above, the protecting mechanism in the three embodiments are projections 126, limiting walls 46', 46", of course, the protecting mechanism in the other alternative embodiments can be any thing which has a front end in front of the position posts 32, 32', 32", the position posts 32, 32', 32" can be protecting from being hit and broken.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An optical receptacle connector of a USB interface configuration, comprising:
    an insulative housing defining a mating plate with thereof a horizontal mating face and a vertical mating face essentially located behind the horizontal mating face;
    a plurality of conductive contacts activated around the horizontal mating face;
    a plurality of optical fiber units activated around the vertical mating face;
    an alignment post extending forward from the vertical mating face for cooperation with the optical fiber units; and
    a protecting mechanism located in front of the alignment post and on an outer side relative to the alignment post so as to stop further insertion of a USB type card which is only equipped with electrical terminals for mating with the conductive contacts while being equipped without optical items for mating with the optical fiber units for protecting the alignment post from being damaged due to confrontation with said USB type card, while allowing full insertion of a USB type plug which is equipped with both the electrical terminals for mating with the conductive contacts and the optical items for mating with the optical fiber units due to said USB type plug being formed with a first receiving cavity for receiving the alignment post and a second receiving cavity for receiving the protection mechanism without interference during mating between the optical receptacle connector and the USB type plug.

2. The optical receptacle connector as claimed in claim 1, further includes a metallic shell enclosing the housing wherein said protection mechanism is formed by at least one of said housing and said shell.

3. An optical plug of a USB interface configuration, comprising:
    an insulative housing defining a mating plate with thereof a horizontal mating face and a vertical mating face essentially located in front of the horizontal mating face;
    a plurality of conductive contacts activated around the horizontal mating face;
    a plurality of optical fiber units activated around the vertical mating face; and
    a first receiving cavity and a second receiving cavity formed around the vertical mating face and forwardly communicating with an exterior and for respectively receiving an alignment post and a protection mechanism of an optical receptacle connector; wherein
    in a transverse direction the optical fiber units are located in an innermost position, the first receiving cavity is located in a middle position and configured to be adapted to receive the corresponding alignment post of the optical receptacle connector and the second receiving cavity is located in an outermost position and configured to be adapted to receive the corresponding protection mechanism of the optical receptacle connector.

4. The optical plug as claimed in claim 3, further including a metallic shell enclosing said housing, wherein said second receiving cavity is formed on at least a side edge of the housing.

5. The optical plug as claimed in claim 3, wherein said first receiving cavity is conical.

* * * * *